Figure 1:
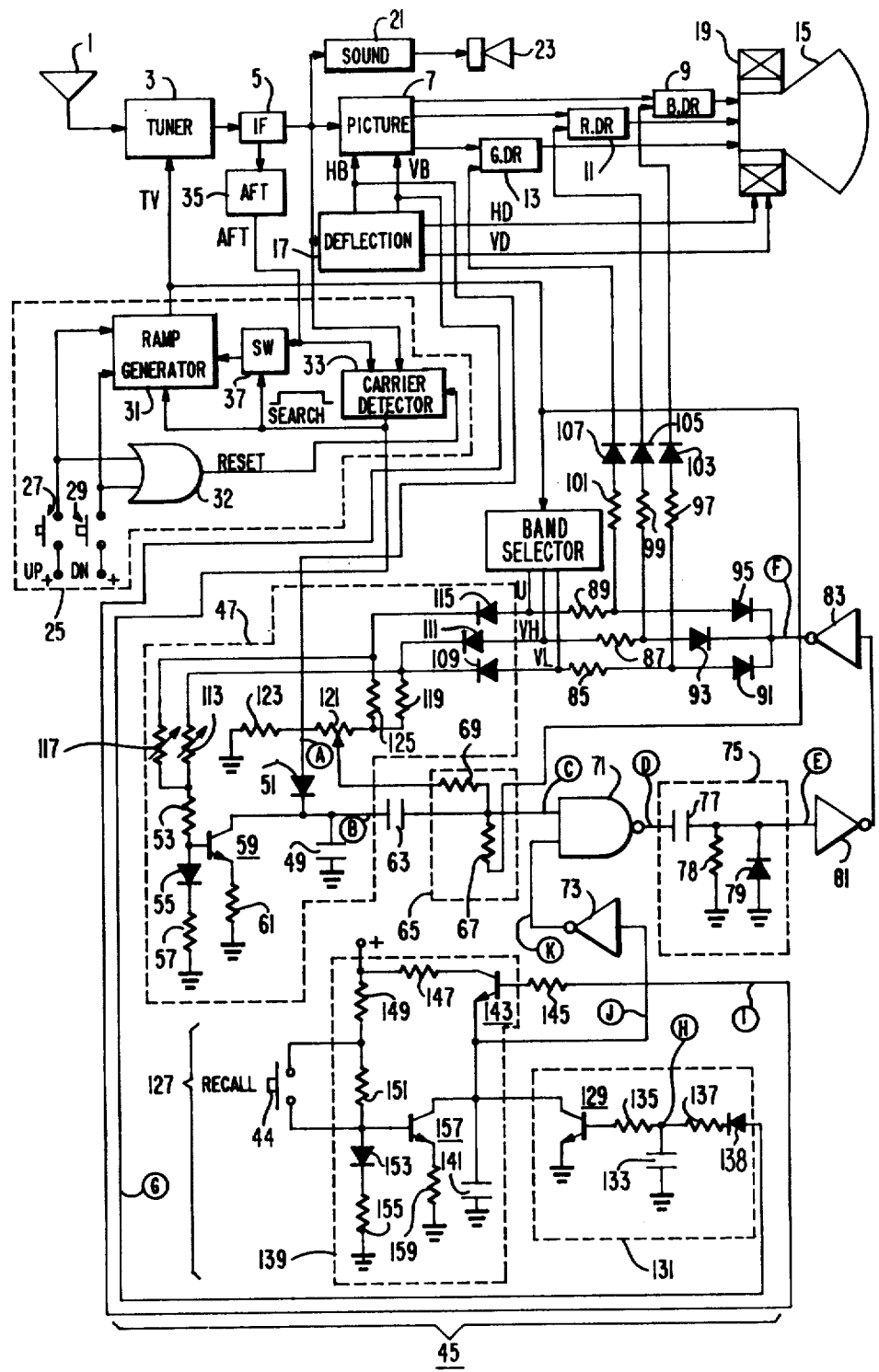

United States Patent [19]

Shiu

[11] 4,366,502
[45] Dec. 28, 1982

[54] BAR TYPE CHANNEL IDENTIFICATION APPARATUS FOR A TELEVISION RECEIVER

[75] Inventor: Tony L. Shiu, Taipei, Taiwan

[73] Assignee: RCA Corporation, New York, N.Y.

[21] Appl. No.: 279,452

[22] Filed: Jul. 1, 1981

[51] Int. Cl.³ .......................................... H04N 5/50
[52] U.S. Cl. ............................. 358/192.1; 358/193.1
[58] Field of Search ........................... 358/192.1, 193.1

[56] References Cited

U.S. PATENT DOCUMENTS

| 2,194,516 | 3/1940 | Anderson | 358/192.1 |
| 2,904,630 | 9/1959 | Bruch et al. | 358/192.1 |
| 2,990,447 | 6/1961 | Stark, Jr. et al. | 358/192.1 |
| 3,003,029 | 10/1961 | Tults et al. | 358/192.1 |
| 3,591,710 | 7/1971 | Uetake et al. | 358/192.1 |
| 4,214,273 | 7/1980 | Brown | 358/192.1 |
| 4,241,361 | 12/1980 | Kamiya | 358/192.1 |

FOREIGN PATENT DOCUMENTS 1226144 10/1966 Fed. Rep. of Germany .

OTHER PUBLICATIONS

"The Clock Module" by W. Clas & P. W. Becker published in the IEEE Transactions on Consumer Electronics, vol. CE-25, Aug. 1979, derived from an article published in Grundig Technische Informationen, vol. 23, No. 3, pp. 741-749, 1976.
"Der Uhr-Baustein" published in Grundig Technische Informationen, 3/76, by W. Clas & P. W. Becker.
"EPM: A New Tuning System on a Single Chip Including Non-volatile Memory", by G. Caironi, published in IEEE Transactions on Consumer Electronics, vol. CE-25, Aug. 1979, pp. 606-620.
Circuit diagrams for the Hitachi model numbers C6-600 and C6-630 television receivers and a Sony receiver, believed to be known by model number KV-400.
"Der Uhr-Baustein" (The Clock Module) by W. Clas & P. W. Becker, published in Grundig Technische Informationen, vol. 23, No. 3, 1976, pp. 741-749.

Primary Examiner—John C. Martin
Attorney, Agent, or Firm—E. M. Whitacre; P. J. Rasmussen; P. M. Emanuel

[57] ABSTRACT

A tuning system of a television receiver of the type which changes the magnitude of a tuning voltage until an RF carrier corresponding to a television channel is located includes channel identification apparatus for generating a vertical tuning bar at a predetermined height and having a horizontal position determined by the magnitude of the tuning voltage until a carrier is detected and after a carrier is detected gradually changing its height until it disappears to provide a positive indication to a viewer that a carrier has been detected.

11 Claims, 6 Drawing Figures

BAR TYPE CHANNEL IDENTIFICATION APPARATUS FOR A TELEVISION RECEIVER

The present invention pertains to the field of channel identification apparatus for electronically tuned television receivers.

Tuners of television receivers include: a RF (radio frequency) section for filtering from among a plurality of received RF carriers an RF carrier associated with the selected channel; a local oscillator section for generating a local oscillator signal and controlling its frequency also in accordance with the selected channel; and a mixer for herterodyning the selected RF carrier and the local oscillator signal to produce an IF (intermediate frequency) signal. The IF signal is demodulated to produce picture and sound representative signals. Typically, electronic tuners include voltage controlled capacitance diodes, commonly referred to as "varactor" diodes, responsive to the magnitude of a tuning voltage as the frequency selective elements of the RF and local oscillator sections.

Several types of tuning control systems for generating the tuning voltage and for controlling its magnitude in accordance to the selected channel are known. These may be categorized into three general types: frequency synthesis, voltage synthesis and signal seeking. Frequency synthesis tuning systems typically include a frequency divider for dividing the frequency of the local oscillator signal and a comparator arrangement for comparing the resultant frequency to the correct value for the selected channel to generate an error signal from which the tuning voltage is derived. Voltage synthesis tuning systems include memory apparatus for storing the tuning voltages for various channels that may be selected. Signal seeking tuning systems include scanning apparatus for changing the magnitude of the tuning voltage until an RF carrier corresponding to a channel is detected. Frequency and voltage synthesis tuning are relatively expensive compared to signal seeking tuning systems. However, signal seeking tuning systems have a problem with respect to channel identification.

In frequency and voltage synthesis tuning systems, the tuning process starts with the selection of the desired channel. Accordingly, the channel number of the selected channel is known. However, in signal seeking tuning systems the tuning process starts with the location of a channel and the channel which has been tuned must then be identified.

Channel identification apparatus for signal seeking tuning systems are known which generate the exact channel number either by counting the frequency of the local oscillator signal or by comparing the tuning voltage to comparison voltages for each channel which are stored in a memory. However, such channel identification apparatus may be so expensive that they may remove the cost advantage of signal seeking tuning systems.

It is also known in a signal seeking tuning system to generate a vertical bar on the screen of the television receiver which has its horizontal position determined by the magnitude of the tuning voltage. The channel number can be determined by comparing the horizontal position of the vertical bar to channel numbers printed on the bottom of the mask surrounding the screen. The bar moves horizontal as the tuning system is seeking a channel. When a channel is located, the tuning bar disappears.

The present inventor has found that if the tuning bar is made to gradually change in length when a channel is located, it provides a much more striking and positive indication to a user that a channel has been located than that provided by prior tuning bar systems.

Therefore, according to the present invention, a tuning system of a television receiver including search means for changing the magnitude of a tuning signal in order to locate carriers corresponding to channels and tuning bar generating means for generating a bar on the screen of a television receiver which has its position, in the direction of substantially perpendicular to its length, determined in response to the magnitude of a tuning signal, also includes bar length control means responsive to said search means for gradually changing the length of the tuning bar when a carrier corresponding to a channel is located.

According to one aspect of the present invention, the length of the bar is relatively large during the search operation and caused to be gradually reduced and eventually disappear when a channel has been located. According to another aspect of the present invention, the bar length control means includes user activated recall means for selectively causing the tuning bar to reappear on the screen but at a reduced length compared to its length during the search operation.

The present channel identification apparatus will be described with reference to the accompanying diagram including: FIG. 1 which is a schematic diagram of an embodiment of the present channel identification apparatus as employed in a color television receiver; FIGS. 2A, 2B, 2C, 3A and 3B which depict what a user observes when embodiments of the present channel identification apparatus are employed; and FIGS. 4, 5 and 6 which depict various waveforms facilitating and understanding of the embodiment shown in FIG. 1.

With reference to FIG. 1, a color television receiver includes an antenna system 1 for receiving VHF (very high frequency) and UHF (ultra high frequency) RF carriers and tuner 3 for converting selected RF carriers to an IF signal in response to the magnitude of a tuning voltage (TV). The IF signal is filtered and amplified by an IF section 5. Luminance and chrominance components of the IF signal are processed by a picture processing unit 7 to derive signals representing blue (B), red (R) and greeen (G) color information. The color signals are amplified by respective drivers 9, 11 and 13 and applied to respective electron beam guns of a picture tube 15. Deflection components of the IF signal are processed by a deflection unit 17 to derive horizontal deflection (HD) and vertical deflection (VD) signals which are applied to deflection coils 19. Deflection coils 19 deflect the electron beams generated by kinescope 15 along successive horizontal lines until a complete field is produced. At the end of each horizontal line the electron beams are retraced to the beginning of the next line during a horizontal retrace interval. At the end of each field, the electron beams are retraced to the beginning of the next field during a vertical retrace interval. Deflection unit 17 generates horizontal blanking (HB) and vertical blanking (VB) pulses which are applied to picture processing unit 7 for preventing the generation of the electron beams during the respective retrace intervals so that retrace lines are not visible. Sound components of the IF signal are processed by a sound section 21 to derive an audio signal which is applied to a speaker 23.

Portions of the television receiver may be constructed in the same manner as portions of television receivers manufactured by RCA Corporation of Indianapolis, Ind., employing a CTC-115 described in "RCA Television Service Data—Chassis CTC 115 Series," File 1981-C-4 published by RCA Corporation, Indianapolis, Ind., which is incorporated by reference.

The tuning voltage is generated by a signal seeking tuning control system 25. The signal seeking operation of tuning control system 25 is initiated when a user depresses one of an UP switch 27 or DN (down) switch 29 which causes a ramp generator 31 to generate an increasing or decreasing, respectively, voltage as the tuning voltage. The depression of either switch also causes an OR gate 32 to generate a RESET signal for resetting the output signal of a carrier detector 33 to a high logic level indicative of the signal seeking or search mode of operation.

As the tuning voltage is swept, components of the IF signal are examined by carrier detector 33 to determine if a channel has been located. As shown, by way of example, carrier detector 33 examines the condition of the AFT (automatic fine tuning) voltage generated by an AFT discriminator 35 representative of the frequency deviation between the picture component of the IF signal and its nominal value (e.g., 45.75 MHz in the United States). The AFT discriminator utilized in the RCA CTC-115 referred to above is suitable for this purpose. To ensure that a channel has been correctly located, as is shown, carrier detector 33 may also be responsive to the deflection components of the IF which are normally proper only when a channel has been properly tuned.

When a channel has been located the output signal of carrier detector 33 becomes a low logic level. This stops ramp generator 31 from changing the tuning voltage further. It also causes a switch (SW) 37 to close thereby applying the AFT voltage to ramp generator 31. The AFT voltage maintains the tuning voltage, which might otherwise drift due to environmental conditions, at substantially constant magnitude.

A signal seeking tuning control system suitable for use as tuning control system 25 is described in U.S. Pat. No. 4,254,506 issued in the names of Henderson and Maturo on Mar. 3, 1981, which is incorporated by reference.

Figure 2A:
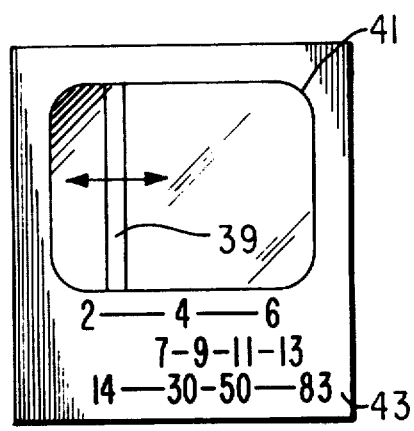
Figure 2B:
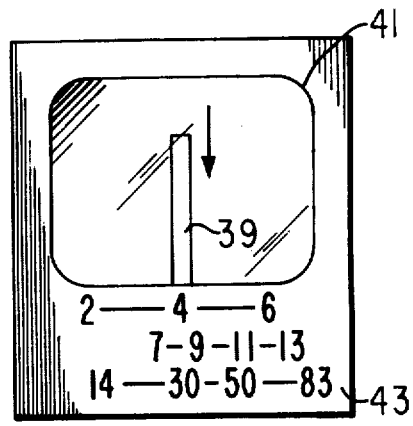
Figure 2C:
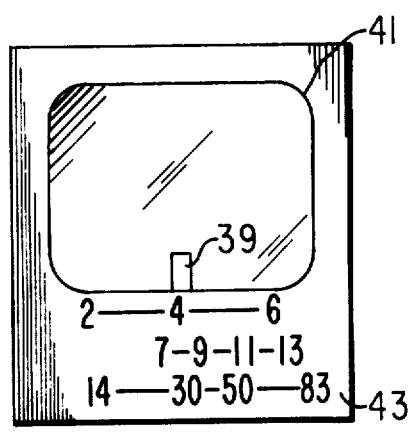

The operation of the channel identification apparatus of FIG. 1, as observed by a user, is indicated in FIGS. 2A, 2B and 2C. The channel identification apparatus produces a vertical bar 39 on screen 41 of picture tube 15 which has its instantaneous horizontal position determined by the magnitude of the tuning voltage. As is indicated in FIG. 2A, as the tuning voltage is being increased or decreased to seek a channel, bar 39 moves to the right or left, respectively, and has a full height extending from the bottom to the top of screen 41. As is indicated in FIG. 2B, when a channel has been located, bar 39 stops moving horizontally and gradually shrinks in height from the top to the bottom of screen 41 until it disappears. This vertical contraction positively informs the user that a channel has been located. The channel numbers of the channel that has been located can be determined by reference to the channel numbers printed along the bottom of a mask 43 surrounding screen 41. The channel numbers are partitioned into groups corresponding to the three television bands: low VHF including channels 2 through 6; high VHF including channels 7 through 13; and UHF channels including channels 14 through 83. The color of bar 39 is caused to be different for each band so that the band of the channel can be determined. When a RECALL push button 44 (see FIG. 1) is depressed, vertical bar 39 reappears to allow a user to determine the channel he has been watching. As is indicated in FIG. 2C, during recall, bar 39 has a height substantially shorter than the distance between the top and bottom of screen 41 so as not to significantly obscure the picture.

Again, with reference to FIG. 1, the present channel identification apparatus, generally indicated as 45, includes a sawtooth voltage generator 47 including a capacitor 49 to which the horizontal blanking (HB) pulses are applied through a diode 51. Capacitor 49 is rapidly charged in response to the HB pulses and in the horizontal trace interval between the HB pulses slowly discharges through a constant current circuit comprising resistor 53, diode 55, resistor 57, NPN transistor 59 and resistor 61 (see waveforms A and B of FIG. 4). Constant current circuit 53-61 establishes the current flowing through the collector-emitter path of transistor 59, and thereby the discharge current of capacitor 49, by establishing the voltage drop across emitter resistor 61. This is done by supplying a current which is made dependent on the band for the reasons stated below, through resistors 53 and 57 to develop a voltage across resistor 57. The voltage drops across diode 55 and the base-emitter junction of transistor 59 substantially cancel each other thereby making the voltage across resistors 57 and 61 substantially equal.

The DC component of the sawtooth voltage developed across capacitor 49 is removed by DC blocking capacitor 63 and the remaining AC component is applied to a DC level shifting circuit 65. Level shifting circuit 65 couples the tuning voltage (TV) to the output side of capacitor 63 through a resistor 67 to add a DC level which changes as the magnitude of the tuning voltage changes to the AC component of the sawtooth voltage (see waveform C of FIG. 4). For the reasons explained below, a fixed portion of DC level of the resulting sawtooth voltage is determined by a band dependent voltage coupled to the output side of capacitor 63 by a resistor 69.

The resulting level shifted sawtooth voltage is applied to a voltage comparator 71. As shown, voltage comparator 71 takes the form of a NAND gate 71. Assuming NAND gate 71 is enabled, as will be described below, by the application of a high logic level applied to the one of its inputs from a logic INVERTER 73, the output of NAND gate 71 will switch from a low logic level to a high logic level when the magnitude of the DC level shifted sawtooth voltage applied to its other input falls below its threshold voltage (see waveforms C and D of FIG. 4). Thus, the positive-going edges (as well as the negative-going edges) of the pulses produced by comparator 41 occur at times determined by the magnitude of the tuning voltage.

A differentiating circuit 75, comprising series connected capacitor 77 and shunt connected resistor 78, generates positive and negative-going transients corresponding to the positive and negative edges of the pulses generated by comparator 71. A shunt connected diode 79 is poled to remove any negative-going transients that exceed its conduction voltage, e.g., approximately 0.7 volts (see waveform E of FIG. 4 in which the small negative going transients that remain are not shown for the sake of simplicity).

Figure 4:
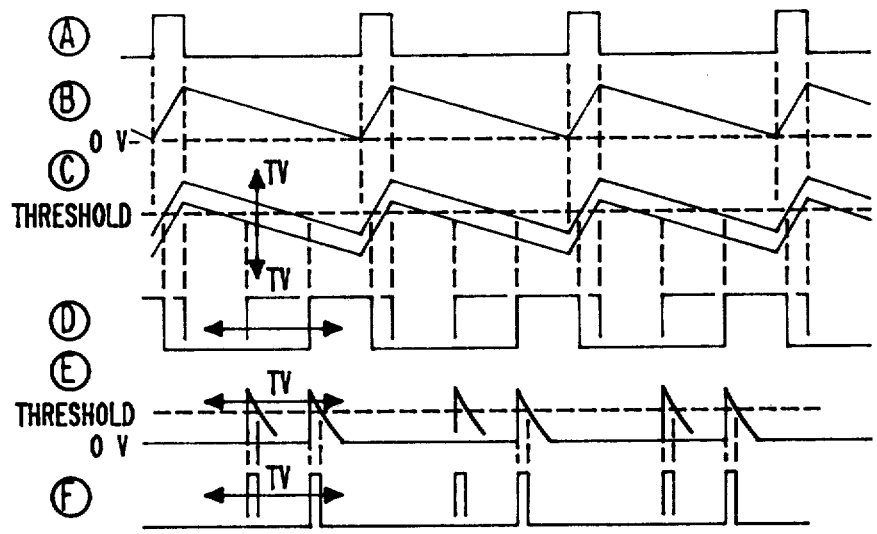

A voltage comparator including two cascaded INVERTERS 81 and 83 generates positive-going pulses when the transients generated by differentiating circuit 75 have amplitudes greater than the threshold voltage of INVERTER 81 (see waveform F of FIG. 4). Since the position in time in which the positive-going edges of the output pulses of comparator 71 depend on the magnitude of the tuning voltage, so do the positive-going edges of the output pulses of INVERTER 83. The width of the latter pulses is determined by the time constant of differentiating circuit 75 and the threshold of INVERTER 81. Depending on the band selected, as will be described below, these positive-going pulses are applied to one of blue, red and green drivers 9, 11 and 13, respectively, to cause a correspondingly colored vertical bar (39 in FIGS. 2A, 2B and 2C) to be developed at a horizontal position determined by the magnitude of the tuning voltage. The width of the bar corresponds to the width of the output pulses of INVERTER 83.

A band selector, simply comprising a voltage comparator, determines when the tuning voltage has reached a magnitude corresponding to the boundary value of a band and generates a respective bandswitching signal: VL for channels 2-6; VH for channels 7-13 or U for channels 14-83. The bandswitching voltages VL, VH and U have a positive level, e.g., +10 volts, which are applied respectively through resistors 85, 87 and 89 to pulse gating diodes 91, 93 and 95 and through resistors 97, 99 and 101 to drive gating diodes 103, 105 and 107. When a bandswitching voltage, e.g., VL, is generated, its respective pulse gating diode, e.g., 91, is rendered conductive and its respective drive gating diode, e.g., 103, is rendered nonconductive. Thereafter, in response to the positive-going output pulses of INVERTER 83, the pulse gating diode, e.g., 91, is rendered nonconductive and bandswitching voltage, e.g., VL, is thereby enabled to render the drive gating diode, e.g., 103, conductive and the respective driver, e.g., 9, is turned on.

The tuning voltage characteristics for the VHF and UHF bands have different ranges and different rates of change. Accordingly, as earlier mentioned, the discharge current of constant current circuit 53-61 of sawtooth circuit 47 and the fixed voltage applied to DC level shifting circuit 65 are dependent on the band selected to compensate for these differences. To this end, when either of the VL or VH bandswitching voltages are generated a respective one of diodes 109 and 111 is forward biased thereby coupling the bandswitching level, e.g., +10 volts, to resistor 53 of sawtooth circuit 47 through a potentiometer 113 and to resistor 69 of level shifting circuit 65 through a voltage divider including resistor 119, potentiometer 121 and resistor 123. When the U bandswitching voltage is generated, a diode 115 is forward biased thereby coupling the bandswitching level to resistor 53 through a potentiometer 117 and to resistor 69 through a voltage divider including resistor 125, potentiometer 121 and resistor 123. Potentiometers 113 and 117 are adjusted to provide different discharge rates for the VHF and UHF bands. Resistors 119 and 125 are selected in conjunction with the position of the wiper of potentiometer 121 to provide different effective threshold voltages for comparator 71 for the VHF and UHF bands.

The height of the vertical bar is controlled by a height control circuit 127. The output signal of carrier detector 33 is applied to the base of a NPN transistor 129 included in a circuit 131 the function of which will be described below. During the signal seeking operation, the output of carrier detector 33 is at a high logic level which causes transistor 129 to be conductive. This, in turn, causes INVERTER 73 to which the collector of transistor 129 is coupled, to produce a high logic level. As a result during the signal seeking mode the NAND gate comprising comparator 71 is enabled and a full vertical tuning bar is produced.

Figure 5:
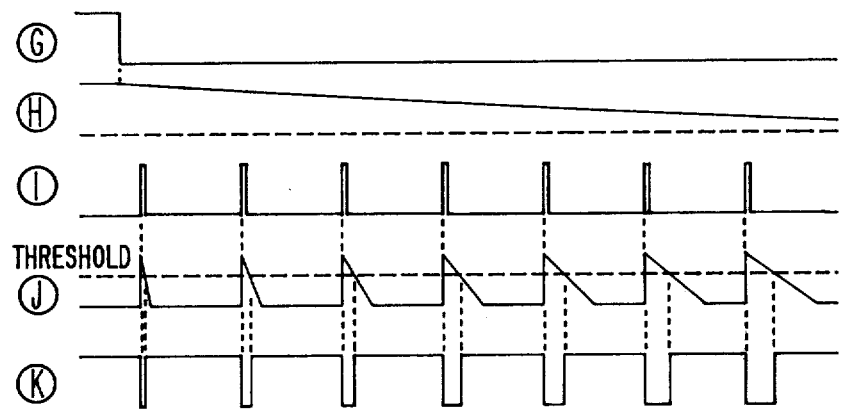

When a carrier has been detected, the output of carrier detector 33 becomes a low logic level (see waveform G of FIG. 5). However, transistor 129 does not immediately become nonconductive but rather slowly becomes nonconductive because a storage capacitor 133 connected, in shunt with the base of transistor 129 through a resistor 135 and previously charged to the high logic level produced by carrier detector 33 during the signal seeking mode and applied to it through a resistor 137 and diode 138, must discharge through resistor 135 and the base emitter junction of transistor 129 (see waveform H of FIG. 5). The conductivity of transistor 129 affects the period in which comparator 71 is enabled and thereby the height of the vertical tuning bar after a channel has been detected as will now be described.

Height control circuit 127 includes a sawtooth voltage generator 139 to which the vertical blanking (VB) pulse is applied. Sawtooth generator 129 includes: capacitor 141; an emitter follower amplifier, including NPN transistor 143, resistor 145 for applying the VB pulse to the base of transistor 143 and a resistor 147 connected between a source of positive supply voltage, e.g., +10 volts, and the collector of transistor 143 by which the VB pulse is applied to capacitor 141; and a constant current circuit similar to that of the horizontal sawtooth generator 47 and including resistors 149 and 151, diode 153, resistor 155, NPN transistor 157 and resistor 159 for discharging capacitor 141. Capacitor 131 is rapidly charged in response to the VB pulses and in the vertical trace intervals between the VB pulses relatively slowly discharges at the rate determined by the current of constant current circuit 149-159 and the impedance of the collector-emitter path of transistor 129 (see waveforms I and J in FIG. 5).

INVERTER 73 acts as a threshold comparator and generates high logic levels for enabling NAND gate 71 only when the amplitude of the sawtooth waveform is above the threshold voltage of INVERTER 73 (see waveform J and K of FIG. 5). As the impedance of the collector-emitter path of transistor 129 increases, the discharge current of capacitor 141 decreases and the slope of the discharge portion of the sawtooth voltage (waveform J of FIG. 5) decreases. This causes the duration of the high logic levels for enabling NAND gate 71 to successively decrease or, conversely, the low logic levels for disabling NAND gate 71 to successively increase (see waveform K of FIG. 5). Since the disabling portions occur immediately after the vertical blanking pulses, the length of vertical tuning bar shrinks or contracts on a field by field basis.

Figure 6:
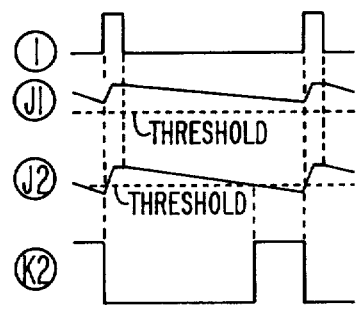

The current of constant current circuit 149-159 and the value of capacitor 141 are selected so that after a predetermined time duration, e.g., several seconds, the rate of decrease of the discharging portion of the sawtooth voltage is low enough so that the discharging portion is completely above the threshold voltage of INVERTER 73 between VB pulses (see waveforms I and J1 of FIG. 6). This causes the tuning bar to disappear. Thereafter, when RECALL button 44 is depressed resistor 151 is bypassed and the current of constant current circuit 149-159 is increased. As a result, capacitor 141 is discharged rapidly enough so that a small portion of the sawtooth voltage is below the threshold between the VB pulses (see waveforms I and J2 of FIG. 6). This causes only a short high logic level for enabling NAND gate 71 to be generated between VB pulses (see waveforms I and K2 of FIG. 6). As a result, a short tuning bar results as earlier described.

Since the threshold voltages of CMOS (complementary metal oxide semiconductor) logic elements are approximately midway between the supply voltages applied to them, they are particularly well for use as the logic elements comprising comparators 71 and 73 (as well as in INVERTERS 81 and 83) since the voltage range over which they can be made to switch output levels is relatively large compared with that of other types of logic circuits such as TTL (transistor-transistor logic) or ECL (emitter-coupled logic).

Listed below are typical component values that have been found suitable for use in the channel identification apparatus shown in FIG. 1 when it is employed in an RCA CTC-115 Color Television receiver referred to above.

| Component | Value |
| --- | --- |
| bandswitching voltage | +10 volts |
| capacitor 49 | 0.0022 microfarads (mf) |
| resistor 53 | 10 kiloohm (K) |
| resistor 57 | 4.7K |
| resistor 61 | 15K |
| capacitor 63 | 0.01 mf |
| resistor 67 | 1 megaohm (M) |
| resistor 69 | 100K |
| capacitor 77 | 390 picofarads |
| resistor 78 | 3.3K |
| resistor 85 | 4.7K |
| resistor 87 | 4.7K |
| resistor 89 | 4.7K |
| resistor 97 | 1K |
| resistor 99 | 1K |
| resistor 101 | 1K |
| potentiometer 113 | 10K |
| potentiometer 117 | 10K |
| resistor 119 | 15K |
| potentiometer 121 | 10K |
| resistor 123 | 10K |
| resistor 125 | 33K |
| capacitor 133 | 4.7 mf |
| capacitor 135 | 100K |
| resistor 137 | 1K |
| capacitor 141 | 0.1 mf |
| resistor 145 | 100K |
| resistor 147 | 3.9K |
| resistor 149 | 27K |
| resistor 151 | 6.8K |
| resistor 155 | 47 ohms |
| resistor 159 | 1K |

Figure 3A:
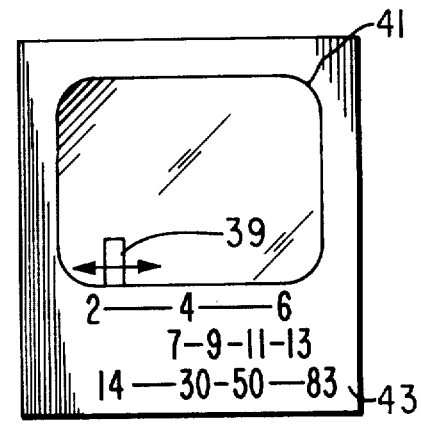
Figure 3B:
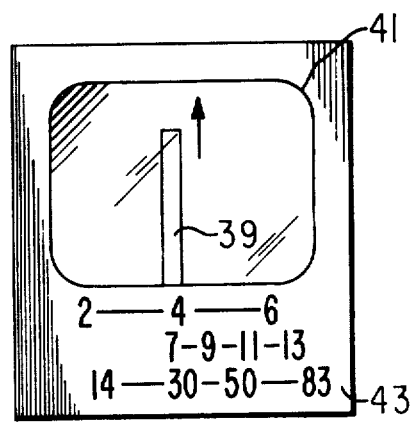

While the present channel identification apparatus has been described with reference to a vertical tuning which has a full height while the signal seeking operation is going on and then shrinks when a channel has been located, it is also possible to cause the tuning bar to have a relatively small height while the signal seeking operation is going on and then increase in height when a channel has been located, as is indicated in FIGS. 3A and 3B, and hereafter shrink. In addition, while the present channel identification apparatus has been described in terms of a vertical tuning bar, the tuning bar may be a horizontal one having its vertical position determined by the magnitude of the tuning voltage and its length (now in the horizontal direction) gradually changed when a channel is located. These and other modifications are intended to be within the scope of the present invention as defined by the following claims.

What is claimed is:

1. In a television including a tuner responsive to the magnitude of a tuning signal for tuning RF carriers to produce an IF signal; search means for changing the magnitude of said tuning signal until an RF carrier corresponding to a television channel has been tuned, said search means generating a search signal having a first level when said tuning voltage is changing and a second level when said tuning signal stops changing after an RF carrier for a television channel has been located; signal processing means responsive to said IF signal for generating at least one video signal; a picture tube responsive to said video signal for generating at least one electron beam; deflection means responsive to said IF signal for generating horizontal and vertical deflection signals for said electron beam; channel identification apparatus comprising:

first means responsive to one of said vertical and horizontal deflection signals and said tuning voltage for controlling said signal processing means to produce a tuning bar on said screen having a position in a direction perpendicular to its length determined by the magnitude of said tuning voltage;

second means responsive to the other one of said deflection signals and to said search signal and coupled to said first means for selectively causing the length of said tuning bar to have a first predetermined value in response to the first level of said search signal and to change by increments at the rate of said other deflection signal to a second predetermined value, different from said first predetermined value, in response to the second level of said search signal.

2. The channel identification apparatus recited in claim 1 wherein:

said first value is substantially greater than said second value.

3. The channel identification apparatus recited in claim 2 wherein:

said second predetermined value is selected so that said tuning bar is not within the portion of said screen visible to a user; and said second means includes a switching element and recall means for selectively causing the length of said tuning bar to have at a third predetermined value, greater said second value at which said tuning bar is within the portion of said screen visible to a user when said switching element is activated.

4. The channel identification apparatus recited in claim 3 wherein said first value substantially equals the dimension of said screen visible to a user in the direction of the length of said tuning bar and said third predetermined value is substantially less than said first value.

5. The channel identification apparatus recited in claim 4 wherein:

said first means is responsive to said horizontal deflection signal for causing the length of said tuning bar to be substantially vertical;

said second means is responsive to said vertical deflection signal for selectively causing the length of said tuning bar to change in the vertical direction in response to the second level of said search signal.

6. The channel identification apparatus recited in claim 5 wherein:

said first means includes first sawtooth generating means for generating a first sawtooth signal in response to said horizontal deflection signal; first comparator means for generating a first pulse when the amplitude of said first sawtooth signal has a predetermined amplitude relationship to a first threshold value; and first threshold control means for controlling the amplitude relationship between said first sawtooth signal and said first threshold value in response to the magnitude of said tuning signal;

said second means includes second sawtooth generating means for generating a second sawtooth signal in response to said vertical deflection signal; second comparator means for generating a second pulse when the amplitude of said second sawtooth signal has a predetermined amplitude relationship to a second threshold value; and second threshold control means for changing the amplitude relationship between said second sawtooth signal and said second threshold value at a predetermined rate in response to the generation of said second level of said search signal; and gating means coupled to said signal processing means for causing said video signal to have a predetermined level in response to the coincidence of said first and second pulses.

7. The channel identification apparatus recited in claim 6 wherein:

said first sawtooth generating means includes a first capacitor; first charging means for applying said horizontal deflection signal to said first capacitor to charge it; and a first current path for discharging said first capacitor with a first current;

said second sawtooth generating means includes a second capacitor; second charging means for applying said vertical deflection signal to said second capacitor to charge it; and a second current path for discharging said second capacitor with a second current; and said second threshold control means causes the amplitude of said second current to decrease at said predetermined rate in response to the generation of said second level of said search signal.

8. The channel identification apparatus recited in claim 7 wherein:

said recall means selectively causes the amplitude of said second current to increase when said switching element is activated.

9. The channel identification apparatus recited in claim 8 wherein:

said second threshold control means includes a variable impedance element having a current conduction path connected in shunt with said second capacitor and having a control input for controlling the conduction of said current conduction path; a third capacitor connected in shunt with said control input; and a resistor connected in series with said control input for applying said search signal to said control input.

10. The channel identification apparatus recited in claim 9 wherein:

said first threshold control means includes a fourth capacitor connected in series between said sawtooth generating means and said first comparator means for coupling the AC component of said first sawtooth signal to said first comparator means and DC insertion means for adding the tuning signal to said AC component of said first sawtooth signal at said first comparator.

11. The channel identification apparatus recited in claim 10 wherein:

said first comparator means includes a coincidence logic gate having one input to which said fourth capacitor and said DC insertion means are connected for additively coupling the AC component of said first sawtooth and said tuning signal to said coincidence logic gate and having a second input to which said second pulse is applied, coincidence logic gate producing a third pulse when the signal applied to said first input has a predetermined amplitude relationship to the switching threshold of said coincidence gate and said second pulse is present; and differentiating means for differentiating said third pulse to generate a fourth pulse corresponding in time to one of the edges of said third pulse; and a second logic gate for generating said first pulse when said fourth pulse has a predetermined amplitude relationship to the switching threshold of said second logic gate.

* * * * *